Dec. 8, 1953 A. F. HOPPE 2,661,555
GATE OPENING AND CLOSING MEANS
Filed June 11, 1951 3 Sheets-Sheet 2
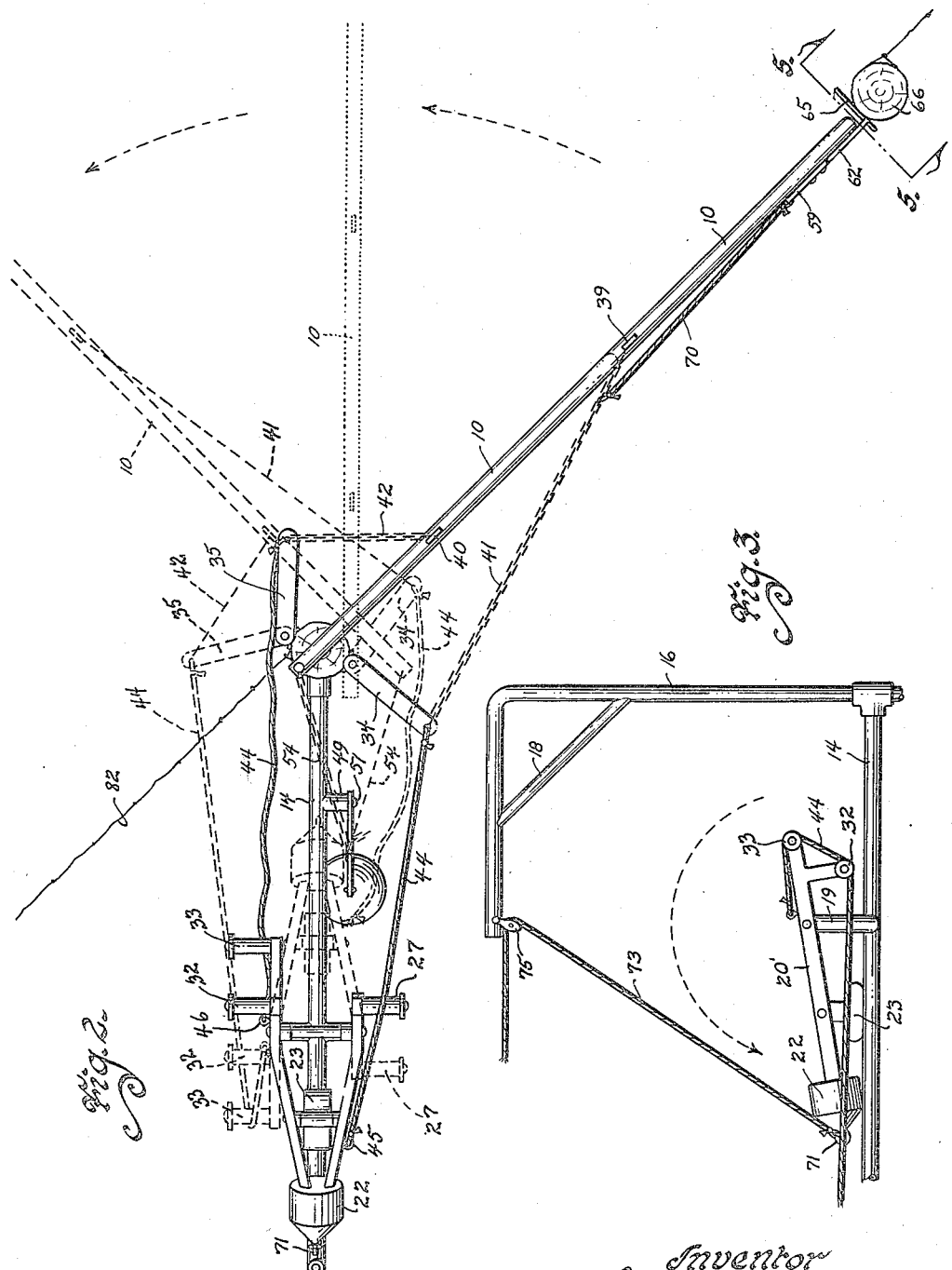
Inventor
Adolph F. Hoppe
by M. Talbert Dick
Attorney Dec. 8, 1953     A. F. HOPPE     2,661,555
GATE OPENING AND CLOSING MEANS
Filed June 11, 1951     3 Sheets-Sheet 3
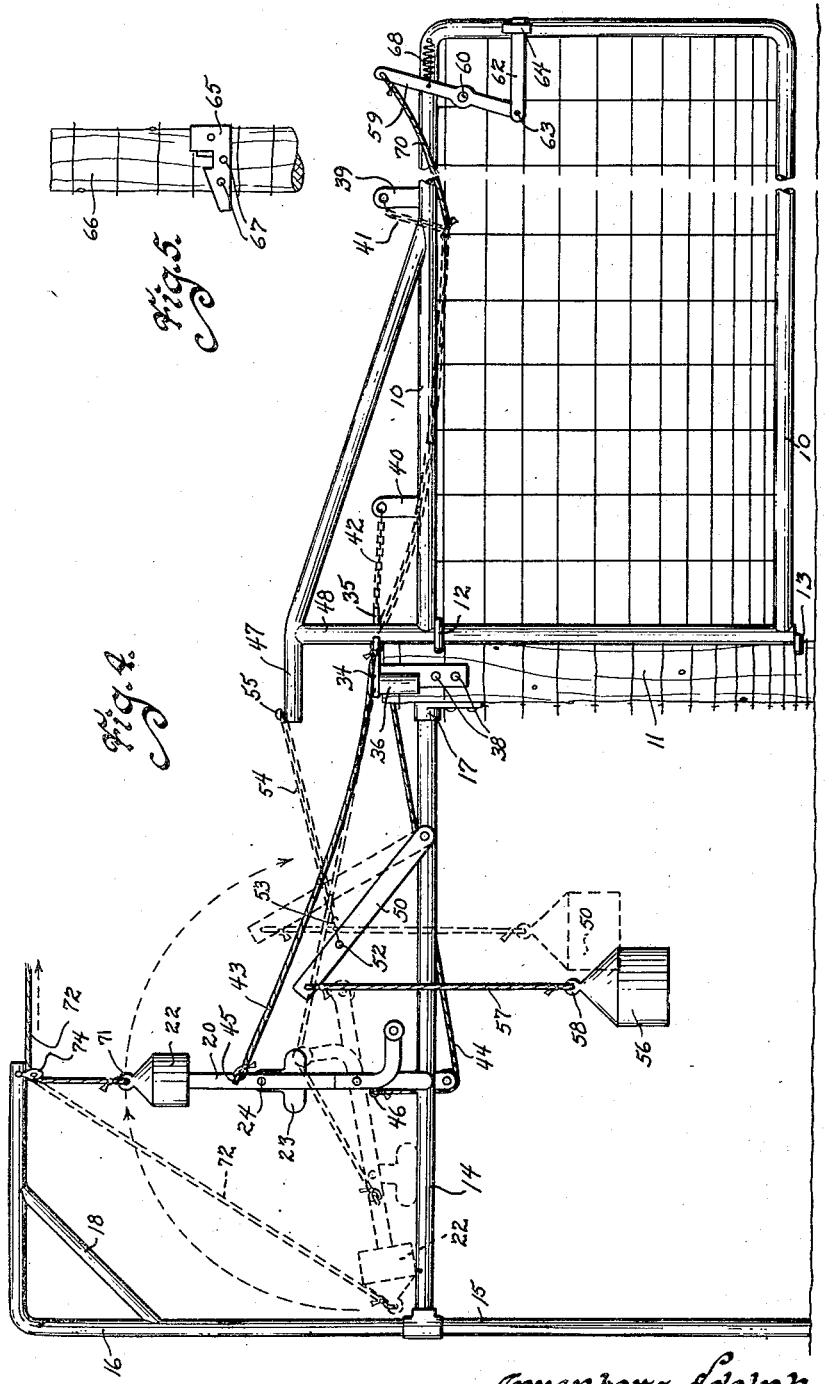
Inventor: Adolph F. Hoppe
by M. Talbert Dick
Attorney
Witness
Edward P. Seeley

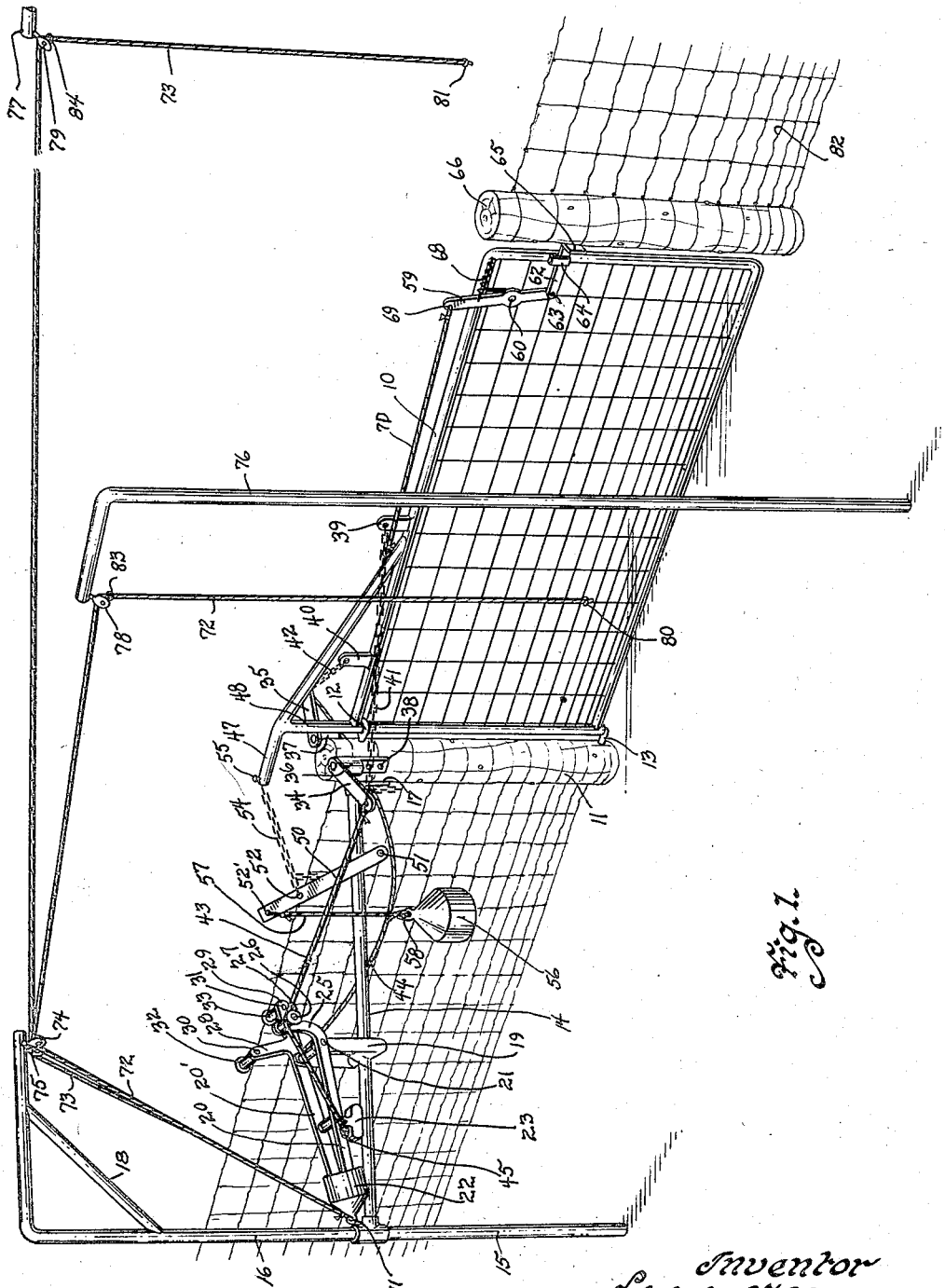

Patented Dec. 8, 1953

2,661,555

UNITED STATES PATENT OFFICE 2,661,555

GATE OPENING AND CLOSING MEANS

Adolph F. Hoppe, Cedar Falls, Iowa

Application June 11, 1951, Serial No. 230,991

5 Claims. (Cl. 39—35)

My invention is a remotely controlled gate opening and closing means that operates entirely by simple mechanical principles. Specifically, my new gate opening and closing means uses a manually energized pendulum as its actuating source of power.

In years gone by when animals were the main source of motive power for farm wagons and other equipment, opening and closing gates was not as great a problem as it has become with the mechanization of the farm. A horse, if at all trained, is responsive to verbal commands. In the days of horse drawn wagons, therefore, the farmer could usually halt the horse at a gate; dismount from the wagon to open the gate; and merely order the horse to go ahead with a verbal command after the gate was opened. When the wagon had been pulled clear of the gate, the farmer halted the horse by ordering him to whoa. The gate was then shut by the farmer who, after closing the gate, walked to and remounted the wagon or the like to continue driving on his intended way. With a horse drawn vehicle, therefore, there was not a serious problem as the farmer only had to walk from the horse to the gate and the gate to the horse and in each case just clear of the path of the gate.

When the farm became mechanized, however, a quite different situation developed. A tractor or automobile being used to tow farm equipment required a driver in the vehicle to produce movement. If the farmer wished to pass through a fence gate, therefore, he had to get off the tractor or out of the car to open the gate and return to the vehicle and drive it through the gate opening. When the towed equipment was clear of the gate, the farmer had to again leave the vehicle and return to close the gate. After the gate was closed the farmer again returned to his vehicle and drove off. The mechanized farmer, therefore, walked twice as far as the old horse farmer did in getting through gates.

It would be possible, of course, in areas that are provided with electricity to have some remotely controlled electrical means for opening and closing gates. Electrical means for accomplishing such results are subject to drawbacks, however, such as power failures, relatively complex installations, comparatively high cost, and problems of sealing the system against moisture and other weather damage. While much farm equipment is now electrified even in the face of possible power failures and other difficulties mentioned above, it would seem to be self-evident that a remotely controlled means for opening and closing a fence gate that does not require the use of electricity would be very desirable.

It is the principal object of my invention, therefore, to provide a gate opening and closing means that is remotely controlled and does not employ electricity in its operation.

It is a further object of my invention to provide a gate opening and closing means that is operable from either side so that the farmer may open or close the gate no matter from which side the fence is approached.

It is a further object of my invention to provide a gate opening and closing means that requires no special precautions, housings, or sealing against adverse weather conditions.

It is a still further object of my invention to provide a system that is not susceptible of breakdown or failure and that may be repaired by farmers without the need to call in skilled or highly trained mechanics.

It is a still further object of my invention to provide gate opening and closing means that for any one gate is a complete independent system not related to the means for actuating any other gate.

It is a further object of my invention to provide a gate opening and closing means that is economical to operate and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my gate opening and closing means set up to open and close a gate mounted in a fragmentary showing of a fence. A portion of one of the gate opening and closing means control ropes and the supporting post or standard therefor are broken away and shown only in part to conserve space.

Fig. 2 is a top view of my gate opening and closing means connected to a gate mounted in a fence that is shown only fragmentarily. Broken lines illustrate the open position of the gate, and dotted lines show the gate at the midpoint of its movement.

Fig. 3 is a fragmentary showing of the pendulum of my gate opening and closing means to illustrate more clearly the position of the roller guide spools with relation to the opening flexible element or rope when the mechanism has been actuated to the open position.

Fig. 4 is a side view of my gate opening and closing means mounted on a gate, a portion of which is not shown to conserve space. The mechanism is shown at the mid-point of its movement and broken lines illustrate the closed position of the mechanism from which it has been actuated to the mid-position toward opening the gate.

Fig. 5 is a fragmentary view of the latch carrying fence post to illustrate the shape of the fixed portion of the latch and taken on the line 5—5 of Fig. 2.

Referring to the drawings I have used the numeral 10 to designate a fence gate that is hingedly mounted to a gate post 11 by means of hinge ring 12 and hinge pin 13. I have shown this form of hinging as merely being one form of fence gate hinging that is rather commonly used. The particular form of hinging used is not material to the invention, however.

To the gate post 11 is also secured the main frame members 14, 15 and 16 which are joined together at their point of meeting. A socket member 17 serves to secure frame member 14 to gate post 11. The main frame member 16 has a diagonal brace 18 to insure adequate rigidity. Main frame member 14 carries a pendulum pivot support member 19 which may be of any suitable form that will provide lateral stability for pendulum arms 20 and 20' that are hingedly secured to the pendulum pivot support in any suitable manner as by the pin 21. The main weight for the pendulum is designated 22. An auxiliary pendulum weight is designated 23 and is pivotally secured to the pendulum arms 20 and 20' in any suitable way, here shown illustratively by the pin 24. The pendulum arm 20 has a single roller support member 25 formed integrally therewith and extending at substantially right angles to the longitudinal axis of the arm 20, but substantially within the plane of movement of the arm as shown in Figs. 1 and 2. A roller pivot 26 is rigidly secured to the roller support 25 and projects laterally therefrom in a direction away from the main frame. A spool roller 27 is rotatably secured to the roller pivot 26. The other one of the pendulum arms, designated 20', carries two roller support members designated 28 and 29 respectively. Roller support 28 is formed similarly to roller support 25 while the support designated 29 is a straight extension of the arm 20' beyond the pivot pin 21. The support 28 and 29 each carry roller pivots as the ones designated 30 and 31 which in turn rotatably support the spool rollers 32 and 33 respectively.

The gate post 11 also supports leverage arms 34 and 35 respectively which are hingedly supported by the bracket members 36 and 37 respectively. These may be secured in any suitable manner as by the screws 38 in Fig. 1 shown securing bracket 36. Similar screws or like means are used to hold bracket 37 on the opposite side of gate post 11, but these screws or like are not shown. The gate 10 is provided with a pair of rigid pierced ears designated 39 and 40 which serve the purpose of providing a point of attachment for elements such as chains 41 and 42 connecting the leverage arms 34 and 35 respectively to the gate 10. Additional connecting elements such as the ropes 43 and 44 connect the leverage arms to the eyes 45 and 46 respectively on the arms 20 and 20' of the pendulum. The gate 10 is also provided with a counterbalance arm 47 that is rigidly secured to the gate 10 as by welding or the like. The extension 48 of gate pivot post is here shown as formed integrally with the pivot post as I have illustrated a gate that is specially constructed with my gate opening and closing means in mind. This element would have to be added to a standard gate, of course. Between socket 17 and pendulum support member 19 is a counterbalance spacer support member designated 49 that hingedly supports lever arm 50 on boss 51 as shown in all the figures, except Fig. 5. A hole 52 is provided in lever 50 to permit connecting counterbalance arm 47 and the lever arm 50 by some suitable means such as the hook 53 and chain 54. A boss 55 or some other suitable means is provided for securing the chain or like 54 to gate counterbalance arm 47. A second hole 52' is provided to permit the securing of counterbalance weight 56 to lever arm 50 by some suitable means such as rope 57 or the like and eye 58 may be provided on the counterbalance to facilitate attaching the securing means 57 thereto.

A means for latching and unlatching the gate 10 in synchronization with the means for moving the gate is necessary. Consequently a latch lever 59 is moveably secured to gate 10 by a suitable means such as pivot pin 60 which is rigidly secured to the top bar of gate 10 in any practical manner as by welding. The lower end of the latch lever is pivotally connected to latch 62 by a pin 63 or like means. The latch 62 is slidably supported near its other end by the bearing bracket 64 that is secured to gate 10 in any suitable manner as by welding or the like. The latch catch 65 is securely attached to gate post 66 by any suitable means such as the screws 67 or the like. A spring 68 yieldingly holds the latch in an unlatch position as shown in Fig. 4. The hole 69 is provided in the top of latch lever 59 so that an actuating element for moving the latch to a latch position, here shown as rope 70, may be secured to the lever 59. The other end of rope 70 is secured to chain 41 as best shown in Fig. 4.

The means for imparting the initial energy to the pendulum is provided by a pair of ropes or other appropriate flexible elements. Some attaching means such as eye 71 is provided on weight 22 so that ropes 72 and 73 respectively may be secured thereto. The ropes are reeved over the pulleys 74 and 75 respectively or some other suitable friction reducing and direction changing means may be used. At a suitable distance from either side of gate 10 the L-shaped poles 76 and 77 are securely mounted in the ground or held upright in any suitable manner and near the path of normal movement through gate 10. A suitable friction reducing and force direction changing means such as the pulleys 78 and 79 respectively are secured near the ends of the short legs of the L-shaped poles and the ropes 72 and 73 are reeved therethrough. Any means to facilitate holding onto the ropes while exerting a pulling force thereon may be provided such as the knots 80 and 81 respectively at the ends of the ropes.

It would be possible to have the frame element 14 extend from gate post 11 at any desired angle relative to the fence 82, but I have shown it as being angularly displaced from the fence 45° or so as being the preferred arrangement. Such a placement of the frame avoids the usual 90° approach of the fence to the posts if a second fence row is secured to gate post 11 and on the same side of the fence as the gate opening mechanism.

The frame would avoid almost any of the normal gate fence arrangements therefore. When the frame for the actuating mechanism is positioned as shown in the drawings, the gate 10 is substantially in a straight line with the frame when the gate is one-half open as shown by the dotted lines in Fig. 2. This completes the discussion of the construction of my gate opening and closing means, and I will now describe the operation of my device.

The gate 10 is held closed as shown in Figs. 1 and 2 by the action of the pendulum weight 22 which holds the pendulum arms 20 and 20' down against the frame member 14. In this position of the pendulum roller 27 engages rope 43 and exerts a pulling force on chain 41. The rope 70 also has a pulling force exerted on it because of its attachment to chain 41. The latch 62 is extended to the latch position by the movement of latch lever 59. Latch spring 68 is in an extended position under these circumstances as best shown in Fig. 1. As the gate is approached from either side by a person wishing to pass through it, either of the ropes 72 and 73 is pulled. A pulling force exerted on either of these ropes is transmitted to the pendulum weight 22 which lifts it from the frame. As soon as weight 22 is lifted perceptibly, the tension on rope 43 is relieved since roller 27 is being carried upwardly by the movement of pendulum arm 20. As tension is relaxed on rope 43, chain 41, and rope 70, the spring 68 is able to move latch lever 59 to the position shown in Fig. 4 which removes latch 62 from latch catch 65. The gate is then free to move the counterbalance weight 59 starts the movement of gate 10 by exerting a pulling force on counterbalance arm 47. Fig. 2 shows the relative placement of the posts which permits a pulling force to be exerted by counterbalance weight 56. Fig. 4 shows the movement of the counterbalance lever arm 50 and the weight 56. As soon as the pendulum starts moving from the position shown in Fig. 1 toward the position shown in Fig. 4 roller 33 engages rope 44 and pulls leverage arm 35 from the position shown in Fig. 2 with the solid lines toward the position shown in that figure with broken lines. The movement started as described is continued by pulling on one of the ropes 72 and 73.

As the pendulum approaches the top center position, a critical point is reached. The counterbalance has reached the limit of its pulling force and additional pull on the ropes 72 and 73 only tends to halt the pendulum. It is necessary, therefore, for the ropes 72 and 73 to be pulled steadily and evenly until a point approaching that shown in Fig. 4 is reached. The speed of travel of pendulum weight 22 should be increased by increasing the pull on rope 72 or 73 as the case may be. As the position shown in Fig. 4 is nearly reached, the momentum of weight 22 and gate 10 is considerable. The actuating rope is released by the operator and swinging auxiliary pendulum weight 23 comes into play. This weight swings past center if the pendulum shows any tendency to slow down at the intermediate position shown in Fig. 4. Movement of weight 23 past center together with the momentum developed by the device causes the pendulum to swing past center and start falling toward the position shown in Fig. 3. During this process, rollers 33 and 32, in the order listed, engage rope 44 and exert a pulling force thereon by doubling the rope as shown in Fig. 3. As the pendulum reaches the position shown in this last mentioned figure, the gate 10 is pulled all the way open as shown by the broken lines in Fig. 2.

The pendulum and other mechanism works in substantially the same manner but in a reverse direction to that described for the opening of the gate when the gate is being closed. There is one aspect of the closing sequence which is not the reverse of the opening procedure, however, and I will now describe this particular portion of the gate closing action.

When the gate is being closed, a pull is exerted on the rope 43, chain 41, and rope 70. The pull on this series of flexible elements causes the latch lever 59, spring 68, and latch 62 to be moved and held in the position shown in Fig. 1. The latch 62 is extended, therefore, and must enter latch catch 65 in a different manner from the way in which it is removed therefrom. Fig. 5 discloses that latch catch 65 has a slanting shoulder facing in the direction from which the gate 10 moves while being closed. The bearing bracket 64 is considerably larger than the width of latch 62 as best shown in Fig. 4, however, so that latch 62 may move on its hinge pin connection to latch lever 59 if an upward force is exerted on the end of latch 62. When the latch 62 strikes latch catch 65, therefore, latch 62 slides upward over the slanting shoulder of latch catch 65 and seats in the catch notch. The gate is thereby secured in a closed position until tension is again released on rope 70.

In some cases the ropes 72 and 73 may slip from the hand during operation in spite of the precautions of knots 80 and 81. If the knots so slipped from the hand at a point when pendulum weight 22 could exert a snapping action on ropes 72 and 73, it would pull the ropes upwardly through pulleys 78 and 79. Such an event while not fatal to the device would be highly inconvenient. I consider it highly desirable, therefore, although not essential to the operation of the device to provide the ropes 72 and 73 with stop means to insure that they will not be pulled backwards through the pulleys 78 and 79. This means in its simplest form is merely a knot in each rope as the ones designated 83 and 84 respectively. From the foregoing, it is clear that I have invented a remote control fence opening and closing device that is entirely mechanical in its actuation and is not at all susceptible of break down. Furthermore, any farmer would have the necessary skill to make at least temporary repairs if trouble does develop.

Some changes may be made in the construction and arrangement of my gate opening and closing means without departing from the real spirit and purpose of my invention, and it is my intention to cover by my claims, any modified forms of structure or use of mechanical equivalents which may be reasonably included within their scope.

I claim:

1. In a gate opening and closing means adapted for use with a swinging gate hingedly mounted on a gate post, a frame adapted to being secured near a gate post, an inverted pendulum swingably secured to said frame, a pair of arms capable of being hingedly secured to a gate post, a pair of flexible elements each having one end secured to said pendulum; one of said flexible elements having its other end secured to one of said arms; the other of said flexible elements having its other end connected to the other of said arms, a pair of flexible members each having one end secured to said gate; one of said flexible members having its other end connected to one of said arms; the other of said flexible members having its other end connected to the other of said arms, and a manual means for swingably moving said pendulum in two directions.

2. In a gate opening and closing means adapted for use with a swinging gate hingedly mounted on a gate post, a frame adapted to being secured near a gate post, an inverted pendulum swingably secured to said frame, a pair of arms capable of being hingedly secured to a gate post, a pair of flexible elements each having one end secured to said pendulum, an auxiliary weight hingedly secured to said pendulum; one of said flexible elements having its other end secured to one of said arms; the other of said flexible elements having its other end connected to the other of said arms, a pair of flexible members each having one end secured to said gate; one of said flexible members having its other end connected to one of said arms; the other of said flexible members having its other end connected to the other of said arms, and a manual means for swingably moving said pendulum in two directions.

3. In a gate opening and closing means adapted for use with a swinging gate hingedly mounted on a gate post, a frame adapted to being secured near a gate post, an inverted pendulum swingably secured to said frame, an arm adapted to being fixedly secured to a gate to extend longitudinally beyond a vertical extension of an end of a gate, a lever arm hingedly secured to said frame, a weight secured to said lever arm, a flexible connector having one of its ends connected to said fixed arm and the other end connected to said lever arm, a pair of hinged arms capable of being mounted on a gate post, and flexible elements each having one end connected to said pendulum and the other end adapted to being secured to a gate; one of said flexible elements being connected at a point between its ends to one of said hinged arms; the other of said flexible elements being connected at a point between its ends to the other of said hinged arms, and means for swinging said pendulum in two directions.

4. In a gate opening and closing means adapted for use with a swinging gate hingedly mounted on a gate post, a frame adapted to being secured near a gate post, an inverted pendulum swingably secured to said frame, an arm adapted to being fixedly secured to a gate to extend longitudinally beyond a vertical extension of an end of a gate, a lever arm hingedly secured to said frame, a weight secured to said lever arm, a flexible connector having one of its ends connected to said fixed arm and the other end connected to said lever arm, a pair of hinged arms capable of being mounted on a gate post, and flexible elements each having one end connected to said pendulum and the other end adapted to being secured to a gate; one of said flexible elements being connected at a point between its ends to one of said hinged arms; the other of said flexible elements being connected at a point between its ends to the other of said hinged arms, a latch lever adapted to being pivotally secured to a gate, a latch pivotally secured to said latch lever, a collar bracket adapted to being secured to a gate and slidably supporting said latch, a spring yieldingly urging one end of said latch lever in one direction, and a flexible member connecting said latch lever to one of said flexible elements.

5. In combination with a hinged gate, a gate opening and closing means comprising; a frame rigidly mounted near said gate, an inverted pendulum hingedly mounted on said frame and capable of swinging movement in two directions, a pair of flexible elements connecting said pendulum to said gate, rollers on said pendulum selectively engaging and disengaging said flexible elements for alternately shortening one of said flexible elements and lengthening the other of said flexible elements by selectively swinging said pendulum in its two directions of swinging movement, and manual means for swinging said pendulum in two directions.

ADOLPH F. HOPPE.

References Cited in the file of this patent

UNITED STATES PATENTS

| Number | Name | Date |
|---|---|---|
| 475,132 | Merridith | May 17, 1892 |
| 798,846 | Van Pelt | Sept. 5, 1905 |
| 910,782 | Buckman | Jan. 26, 1909 |
| 1,963,212 | Phillips | June 19, 1934 |

FOREIGN PATENTS

| Number | Country | Date |
|---|---|---|
| 617,105 | France | Nov. 10, 1926 |